United States Patent
Bortun et al.

(10) Patent No.: US 10,882,755 B2
(45) Date of Patent: Jan. 5, 2021

(54) METHOD OF MAKING MESOPOROUS ZIRCONIUM-BASED MIXED OXIDES

(71) Applicant: Pacific Industrial Development Corporation, Ann Arbor, MI (US)

(72) Inventors: Anatoly Bortun, Ypsilanti, MI (US); David Shepard, South Lyon, MI (US); Yunkui Li, Ann Arbor, MI (US); Wei Wu, Ann Arbor, MI (US); Jeffery Lachapelle, Northville, MI (US)

(73) Assignee: Pacific Industrial Development Corporation, Ann Arbor, MI (US)

( * ) Notice: Subject to any disclaimer, the term of this patent is extended or adjusted under 35 U.S.C. 154(b) by 0 days.

(21) Appl. No.: 16/088,858

(22) PCT Filed: Mar. 30, 2017

(86) PCT No.: PCT/US2017/024895
§ 371 (c)(1),
(2) Date: Sep. 27, 2018

(87) PCT Pub. No.: WO2017/173018
PCT Pub. Date: Oct. 5, 2017

(65) Prior Publication Data
US 2019/0112198 A1 Apr. 18, 2019

Related U.S. Application Data

(60) Provisional application No. 62/316,753, filed on Apr. 1, 2016.

(51) Int. Cl.
C01G 25/00 (2006.01)
(52) U.S. Cl.
CPC ........ *C01G 25/006* (2013.01); *C01P 2002/50* (2013.01); *C01P 2002/52* (2013.01);
(Continued)

(58) Field of Classification Search
CPC . B01J 23/63; B01J 23/002; B01J 23/10; B01J 35/023; B01J 37/0244;
(Continued)

(56) References Cited

U.S. PATENT DOCUMENTS 7,939,462 B2  5/2011  Larcher et al.
8,022,025 B1*  9/2011  Farning ................ C09K 3/1463
                                              216/88

(Continued)

FOREIGN PATENT DOCUMENTS

JP  2007197311 A  8/2007
JP   200913064 A  1/2009
(Continued)

OTHER PUBLICATIONS

European Patent Office, Rijswijk, Netherlands, International Search Report of International Application No. PCT/US2017/024895, dated Jun. 12, 2017, 3 pages.

*Primary Examiner* — James A Fiorito
(74) *Attorney, Agent, or Firm* — Dickinson Wright PLLC

(57) ABSTRACT

Mesoporous, zirconium-based mixed oxides and a method of making the same comprises: injecting a polyvalent metal-containing solution into an electrolyte solution to form a mother liquor; forming a precipitate; aging the precipitate in the mother liquor to form the mixed oxides; washing the mixed oxides with an aqueous medium; drying and collecting the mixed oxides. The pH of the electrolyte solution exceeds the isoelectric point for zirconium-based mixed oxides. The mixed oxides exhibit a single particle size distribution, improved CeO2 reducibility in the presence of Rhodium, a decrease in surface area after calcination (800-1100° C.) that is not more than 55%, and a tetragonal/cubic structure after calcination. After calcination at 1100° C. for 10 hours in air, the mixed oxides exhibit a surface area >25

(Continued)

m2/g, a pore volume >0.20 cm3/g, an average pore size >30 nm, and an average crystallite size between 8-15 nm.

13 Claims, 1 Drawing Sheet

(52) U.S. Cl.
CPC ...... *C01P 2002/54* (2013.01); *C01P 2004/50* (2013.01); *C01P 2004/52* (2013.01); *C01P 2004/61* (2013.01); *C01P 2006/12* (2013.01); *C01P 2006/14* (2013.01); *C01P 2006/16* (2013.01)

(58) Field of Classification Search
CPC ... B01J 37/0248; B01J 37/03; B01D 53/9413; B01D 53/945; C01F 7/002; C01G 25/006; C01G 25/02
See application file for complete search history.

(56) References Cited

U.S. PATENT DOCUMENTS

| 2012/0036834 A1* | 2/2012 | Qi | B01J 37/031 60/274 |
| 2015/0298099 A1 | 10/2015 | Saito et al. | |

FOREIGN PATENT DOCUMENTS

| JP | 2011098848 A | 5/2011 |
| JP | 2014122149 A | 7/2014 |
| JP | 2015112548 A | 6/2015 |
| WO | 2006070201 A2 | 7/2006 |
| WO | 2015100339 A1 | 7/2015 |

* cited by examiner

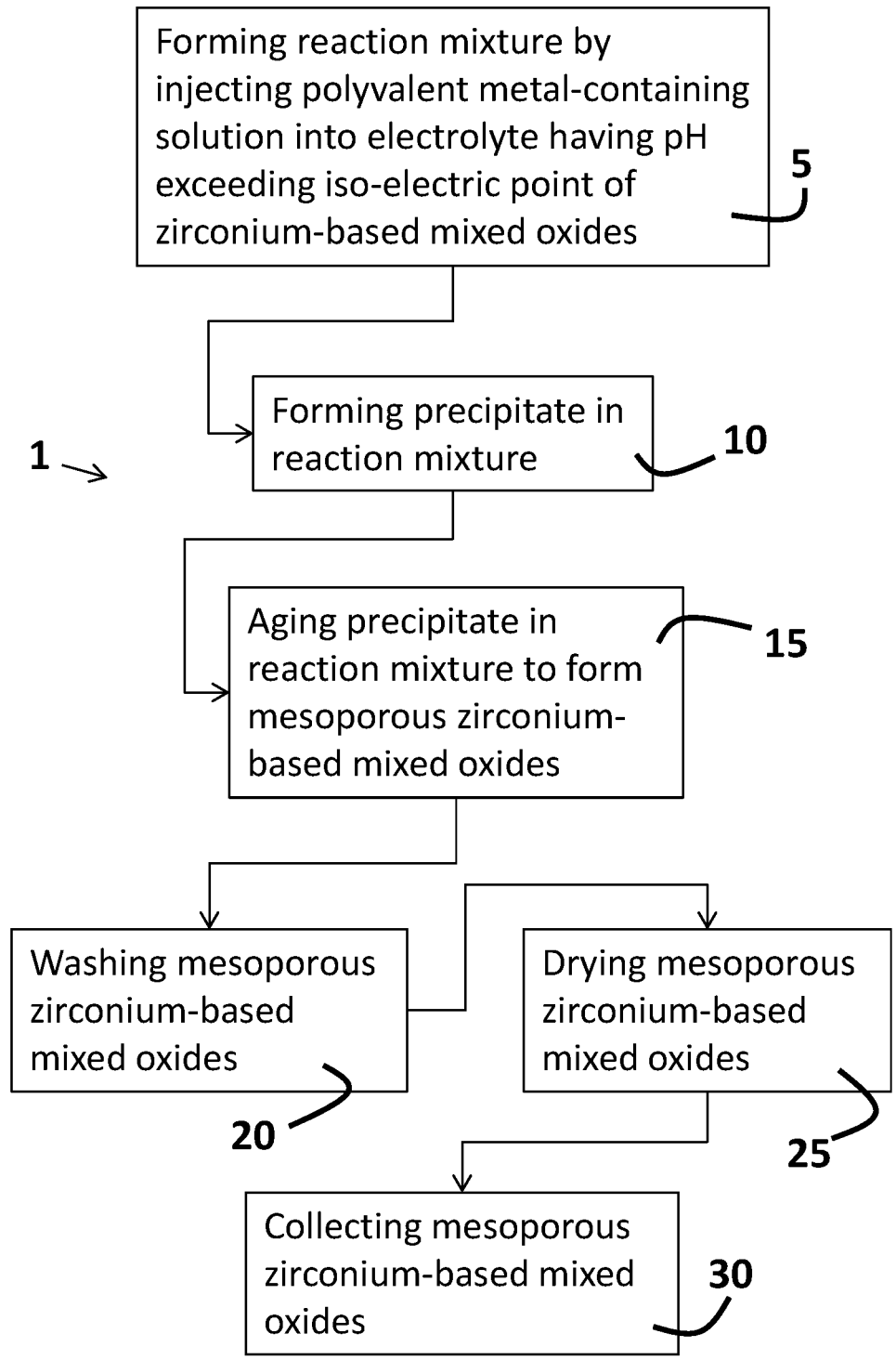

METHOD OF MAKING MESOPOROUS ZIRCONIUM-BASED MIXED OXIDES

CROSS REFERENCE TO RELATED APPLICATIONS

This application is a continuation of International Application Serial No. PCT/US2017/024895 filed Mar. 30, 2017, designating the United States and published in English, which claims the benefit of the filing date under 35 U.S.C. § 119(e) of U.S. Provisional Application No. 62/316,753 filed Apr. 1, 2016, the entire contents of each of which are hereby incorporated herein by reference.

FIELD

This disclosure generally relates to the synthesis of mesoporous, zirconium-based mixed oxides that have enhanced thermal resistance to sintering, a developed surface area and porosity after aging, and enhanced redox properties. These mesoporous, zirconium-based mixed oxides are suitable for use as catalysts and as catalyst support materials.

BACKGROUND

The statements in this section merely provide background information related to the present disclosure and may not constitute prior art.

The present disclosure generally describes a method for the synthesis of mesoporous, zirconium-based mixed oxides that have high thermal stability, resistance to sintering, and enhanced redox activity. Cerium-zirconium mixed oxides can be used as an oxygen storage component in three-way catalysts, which are used to treat exhaust gases in vehicles. Since car exhaust gas catalysts are subjected to exhaust gases that reach temperatures up to 1200° C., the specification for corresponding catalyst support materials includes high thermal stability, resistance to thermal sintering, and an ability to interact with precious metals.

Different techniques can be used to make mixed oxide materials. These different techniques include sol-gel, solid-state reactions between reagents, impregnation, precipitation, co-precipitation, and the like.

Thermally stable mixed oxides made via a heterogeneous solid state reaction between powdered reagents at high temperature exhibit a surface area after aging at 850° C. that exceeds 15 $m^2/g$ (see JP-A-5-155622). U.S Patent Application 2014/0050654 describes a spray pyrolysis technique for the synthesis of a thermally stable mixed oxide that has a surface area of 20 $m^2/g$ after aging at 1100° C. In U.S. Pat. No. 8,765,631, the synthesis of mixed oxides using a melting technique is described. Mixed oxides show high redox activity, but low surface area and pore volume.

The precipitation of reagents sols can produce materials having an aged surface area of 12 $m^2/g$ after calcination at 1050° C. (see JP-A-5-193948). The impregnation of porous organic materials with solutions of reagents followed by combustion yields thermally stable mixed oxides having a surface area that is in excess of 15 $m^2/g$ after aging at 1050° C. (see U.S. Pat. No. 6,139,814).

The precipitation and co-precipitation of the reagents, which are present as solutions, are the most common routes for making thermally stable mixed oxides. Precipitation/co-precipitation of mixed oxides can be achieved: (1) by neutralizing acidic solutions of polyvalent metals by adding a base thereto or (2) by the addition of an acidic solution of polyvalent metals directly into a base solution. In the neutralization of acidic solutions of polyvalent metals with a base in (1) above, zirconium hydroxide is formed first at a relatively low pH, e.g., less than 2, and rare earth metal hydroxides are formed at higher pH, e.g., greater than about 4 or 5. As a result, freshly made co-precipitates are not homogeneous. In the case of adding acidic solutions of polyvalent metals into a base solution as described in (2) above, the precipitation of polyvalent metal hydroxide occurs simultaneously and freshly made precipitate can be regarded as being homogeneous. A modification of this method includes the simultaneous mixing of a polyvalent metal solution and a base solution in a mixer at a specifically chosen pH (see U.S. Pat. No. 8,524,183). The common feature of both approaches is the wide use of organic complexing agents, the use of heat at different stages of the precipitation, the hydrothermal post-treatment of precipitates, and combinations thereof.

Precipitation and co-precipitation techniques yield an aged surface area that is higher than 30 $m^2/g$ after calcination at 950° C. (see U.S. Pat. No. 7,431,910), an aged surface area of at least 25 $m^2/g$ after aging at 1000° C. (see U.S. Pat. No. 6,214,306), an aged surface area of at least 30 $m^2/g$ and a pore volume that is at least 0.4 cc/g after aging at 1000° C. for 3 hours (see U.S. Pat. No. 7,642,210), an aged surface area that is not smaller than 10 $m^2/g$ after aging at 1100° C. for 3 hours (see U.S. Pat. No. 7,927,699), an aged surface area that is at least 20 $m^2/g$ after aging at 1100° C. (see U.S. Pat. Nos. 6,171,572, 7,781,365, 8,460,626), an aged surface area that is at least 25 $m^2/g$ after aging at 1100° C. for 4 hours (see U.S. Pat. No. 8,956,994), an aged surface area that is not smaller than 15 $m^2/g$ after aging at 1100° C. for 12 hours under a reducing atmosphere (see U.S. Pat. No. 7,919,429), and an aged surface area up to 10 $m^2/g$ after calcination at 1150° C. (see U.S. Pat. No. 6,387,338). In U.S. Pat. No. 7,964,527, the mixed oxides are described as having an aged surface area that is at least 30 $m^2/g$ after aging at 1100° C. for 10 hours and at least 20 $m^2/g$ after aging at 1150° C. for 10 hours. The thermal stability of these materials has been achieved by a combination of two main factors—(1) composition, namely, a high content of rare earth dopants ranging from 20 to 30%, and (2) textural formation of a mesoporous structure with specific organic components. However, mixed oxides with high dopant content (>15%) are not widely used in automotive applications due to poor compatibility with precious metals.

In addition to high aged surface area and developed pore volume, ceria-zirconia-based mixed oxides should be sinter resistant. The term, sinter resistant means that there is minimal loss of surface area and pore volume upon aging of a fresh material. This minimizes loss of the precious metals loaded on the mixed oxide surface due to PGM trapping in collapsed pores. U.S. Pat. No. 7,939,462 describes a method of making sinter resistant mixed oxides that lose not more than 15-20% of its surface area upon increasing the temperature from 900° C. to 1000° C. However, this method has a drawback because materials have low surface area 20-30 $m^2/g$ even after calcination at 900° C. U.S. Pat. No. 8,158,551 describes a method of making sinter resistant mixed oxides that change their surface area upon increasing the calcination temperature from 1000° C. to 1100° C. that is not more than 30%.

Another requirement for cerium zirconium mixed oxides is high oxidation-reduction activity. Oxidation-reduction activity is a cooperative phenomenon that occurs between the high surface area of a mixed oxide and the dispersion of the noble metal on the surface. U.S. Pat. No. 7,238,639 describes thermally stable mixed oxides with improved oxygen storage capacity having a surface area that exceeds 20 m²/g after aging at 900° C. U.S. Pat. No. 6,255,242 describes thermally stable mixed oxides having a surface area in excess of 10 m²/g after aging at 1100° C. and that retain a high oxygen storage capacity after heat treatment at 1000° C. U.S. Pat. No. 8,158,551 describes thermally stable mixed oxides that exhibit an aged surface area of at least 15 m²/g after aging at 1100° C. for 4 hours and a high degree of cerium (Ce) reducibility of at least 80% at 1000° C.

Besides high total oxygen storage capacity, another important feature of mixed oxides is the temperature at which oxidation-reduction reactions occur. Materials that are capable of oxidation-reduction reactions at low temperatures are important for solving cold-start emission problems by lowering the "light-off" temperature of the catalyst, thereby, resulting in a reduction in the amount of untreated exhaust gases that are present in the exhaust.

SUMMARY

The present disclosure provides a method for making mesoporous, zirconium-based mixed oxides. The method comprises injecting a polyvalent metal-containing solution into an electrolyte solution to form a mother liquor; forming a precipitate in the mother liquor; allowing the precipitate to age in the mother liquor and form the mesoporous, zirconium-based mixed oxides; washing the mesoporous, zirconium-based mixed oxides with an aqueous medium; drying the mesoporous, zirconium-based mixed oxides; and collecting the mesoporous, zirconium-based mixed oxides. The electrolyte solution has a pH that exceeds the isoelectric point for zirconium-based mixed oxides.

According to one aspect of the present disclosure, the injection of the polyvalent metal-containing solution into the electrolyte solution may occur at pH from about pH(I)+2 up to about pH(I)+4 of the precipitate. By definition, pH(I) represents the pH at the isoelectric point for the zirconium-based mixed oxides.

The polyvalent metal-containing solution may comprise water soluble compounds that have one or more metal elements chosen from the group of zirconium, lanthanides, such as but not limited to, cerium, praseodymium, lanthanum, yttrium, neodymium, transition metals, such as but not limited to, nickel, copper, cobalt, manganese, and group 5 elements, such as but not limited to, Niobium, and combinations thereof dissolved in an aqueous medium. The water soluble compounds are chosen from the group of water soluble metal-containing nitrate salts, chloride salts, acetate salts, sulfate salts, and combinations thereof. The water soluble compounds in the polyvalent metal-containing solution are present in an amount ranging from greater than 0 wt. % up to about 50 wt. %.

The electrolyte solution may comprise water soluble salts containing cations chosen from the group $Li^+$, $Na^+$, $K^+$, $NH_4^+$, and combinations thereof, and anions chosen from the group $Cl^-$, $NO_3^-$, $CH_3COO^-$, $CO_3^{-2}$, $SO_4^{-2}$, and combinations thereof dissolved in an aqueous medium. The injection of the polyvalent metal-containing solution into the electrolyte solution occurs at an ambient or elevated temperature.

The precipitate that forms comprises a plurality of absorption sites, such that the cations and anions of the electrolyte solution that are adsorbed by the precipitate occupy from about 10% up to about 30% of the adsorption sites available under the precipitation conditions. The mother liquor in which the precipitate is formed may comprise from about 3 mmol $OH^-$ up to about 30 mmol $OH^-$ per mole of the mixed oxide. The precipitate may be aged in the mother liquor at an ambient or elevated temperature for a period of time that ranges between about 1 hour and about 6 hours.

The collected mesoporous, zirconium-based mixed oxides prepared according to the teachings of the present disclosure exhibit a specific morphology of freshly made primary particle agglomerates that have a single modal particle size distribution with maximum peaks occurring between about 10 μm and about 15 μm.

According to another aspect of the present disclosure, the method may further comprise exposing the mesoporous, zirconium-based mixed oxides to progressive calcination or thermal aging at a temperature that is in the range of about 800° C. to about 1100° C. The specific resistance of surface area for the mesoporous, zirconium-based mixed oxides decreases by not more than 55% upon such calcination or thermal aging. The mesoporous, zirconium-based mixed oxides also exhibit a $CeO_2$ reducibility in the presence of Rhodium (Rh) which manifests itself by a shift of $T_{max}$ in a TPR-$H_2$ to a lower temperature that is in the range of about 100° C. to about 200° C.

According to yet another aspect of the present disclosure, the mesoporous, zirconium-based mixed oxides may be subjected to calcination at 1100° C. for 10 hours in air, after which the mesoporous, zirconium-based mixed oxides exhibit: (i) a surface area that exceeds 25 m²/g; (ii) a pore volume that exceeds 0.20 cm³/g; (ii) an average pore size that is at least 30 nanometers (nm); and (iv) an average crystallite size that is in the range from about 8 nm to about 15 nm. The mesoporous, zirconium-based mixed oxides after calcination or thermal aging also exhibit a tetragonal/cubic crystalline structure.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 1 is a schematic representation of a method for forming mesoporous, zirconium-based mixed oxides according to the teachings of the present disclosure.

DETAILED DESCRIPTION

The following description is merely exemplary in nature and is in no way intended to limit the present disclosure or its application or uses. It should be understood that throughout the description, corresponding reference numerals indicate like or corresponding parts and features.

The present disclosure generally provides mesoporous, zirconium-based mixed oxides along with a method of making the same. Referring to FIG. 1, the method 1 of making mesoporous zirconium-based mixed oxides consists of, consists essentially of, or comprises the steps of: injecting 5 a polyvalent metal-containing solution into an electrolyte solution that has a pH that exceeds the iso-electric point of zirconium-based mixed oxides to form a mother liquor or reaction mixture; forming 10 a precipitate in the mother liquor; allowing 15 the precipitate to age in the mother liquor to form the mesoporous, zirconium-based mixed oxides; washing 20 the mesoporous, zirconium-based mixed oxides with water; drying 25 the mesoporous, zirconium-based mixed oxides; and collecting 30 the mesoporous, zirconium-based mixed oxides.

The polyvalent metal-containing solution is prepared by mixing water soluble compounds of elements chosen from the group of zirconium, cerium, praseodymium, lanthanum, yttrium, or neodymium, as well as combinations or mixtures thereof into an aqueous medium. The electrolyte solution into which the polyvalent metal is injected comprises water soluble salts dissolved in an aqueous medium. The water soluble sales contain cations chosen from the group of $Li^+$, $Na^+$, $K^+$, $NH_4^+$, and combinations thereof, and/or anions chosen from the group $Cl^-$, $NO_3^-$, $CH_3COO^-$, $CO_3^{-2}$, $SO_4^{-2}$, and combinations thereof. An aqueous medium may include without limitation water, with or without the presence of a water soluble or water miscible co-solvent, including but not limited to alcohols, ketones, and aldehydes.

The injection 5 of the polyvalent metal containing solution into the electrolyte solution occurs at pH from about pH(I)+2 up to about pH(I)+4 of zirconium-based mixed oxide precipitate. The pH at the isoelectric point, commonly written as pH(I), represents the pH at which a particular molecule carries no net electrical charge. The net charge on the molecule may be affected by pH of its surrounding environment and can become more positively or negatively charged due to the gain or loss, respectively, of protons ($H^+$). The pH(I) value can also affect the solubility of a molecule at a given pH. Usually, the molecules will have minimum solubility in water or salt solutions at the pH that corresponds to their pH(I) and will often precipitate out of solution.

The zirconium-based mixed oxide precipitate that forms 10 is allowed to age 15 in the reaction mixture, which can also be referred to as the "mother liquor". This mother liquor may comprise from about 3 mmol $OH^-$ up to about 30 mmol $OH^-$ per mole of mixed oxide. The aging 15 of the zirconium-based mixed oxides may be performed at ambient or an elevated temperature for a duration from about 1 hour up to about 6 hours. The washing of the formed precipitate with water is done to remove any adsorbed anions and cations. According to one aspect of the present disclosure, the polyvalent metal-containing solution comprises a mixture of water soluble nitrates, chlorides, acetates, sulfates of zirconium, cerium, praseodymium, lanthanum, neodymium, yttrium, and combinations thereof dissolved in an aqueous medium. The electrolyte solution comprises water soluble salts containing cations chosen from the group $Li^+$, $Na^+$, $K^+$, $NH_4^+$, and combinations thereof, and anions chosen from the group $Cl^-$, $NO_3^-$, $CH_3COO^-$, $CO_3^{-2}$, $SO_4^{-2}$, and combinations thereof dissolved in an aqueous medium. The cations and anions of the electrolyte solution do not interact specifically or form covalent bonds with the freshly precipitated zirconium based mixed oxide.

According to another aspect of the present disclosure, the injection of the polyvalent metal-containing solution into the electrolyte solution occurs at pH from about pH(I)+2 up to about pH(I)+4 of the zirconium-based mixed oxide precipitate that is formed. The iso-electric point of freshly precipitated zirconium based mixed oxides depend on the zirconium content as a major component and, as well, on the amount of basic dopant elements, such as without limitation, lanthanum, that are present. Typically, the pH(I) of the zirconium-based mixed oxides prepared according to the teachings of the present disclosure is in the pH range from about 7.5 to about 8.8. The interaction of polyvalent the metal-containing solution with the electrolyte solution at pH from (7.5-8.8)+2 to pH (7.5-8.8)+4 allows for the simultaneous co-precipitation of all hydroxides. In addition, under such mild conditions a fraction (from about 10% to about 30%) of mixed oxide functional hydroxyl groups interact with electrolyte ions and become converted into an ion-exchanged form according to Equations 1 and 2 below.

$$\text{M-OH} + \text{Cation} \rightarrow \text{M-O-Cation} \tag{Eq. 1}$$

$$\text{M-OH} + \text{Anion} \rightarrow \text{M-Anion} \tag{Eq. 2}$$

Ion-exchanged functional groups can't participate in the condensation reaction that takes place in highly hydrated polyvalent hydroxides according to Equation 3, thereby, preventing formation of densely packed primary particles aggregates.

$$\text{M-OH} + \text{HO-M} \rightarrow \text{M-O-M} + \text{H}_2\text{O} \tag{Eq. 3}$$

Another aspect of the present invention involves the aging of freshly precipitated zirconium based mixed oxides in the reaction medium or mother liquor, which contains an excess of hydroxyl groups ranging from about 3 mmol OH up to about 30 mmol OH per mole of mixed oxides. This aging is accomplished at about room temperature or at an elevated temperature for duration from 1 hour up to 6 hours. Such mild treatment results in fixation and stabilization of open framework architecture of loosely assembled mixed oxides aggregates, which leads into improvement of product thermal stability. Freshly made mixed oxides according to the present invention are characterized by a specific morphology of primary particles agglomerates, namely, single modal particle size distribution with maximums between at about 10 μm and at about 15 μm The mesoporous, zirconium based mixed oxides prepared according to the teachings of the present disclosure can be characterized by one or more of the following properties: (i) a specific resistance of surface area that decreases with progressive calcination/aging; (ii) a particular surface area and pore size distribution after aging; (iii) a specific increase in redox activity; and (iv) a predominantly tetragonal crystalline/cubic structure after calcination with an average crystallite size in the range from about 8 nanometers (nm) to about 15 nm after aging at 1100° C. for 10 hours in air. The zirconium-based mixed oxides of the present disclosure have a specific resistance of surface area that decreases by not more than about 55% upon progressive calcination/aging within a temperature range from 800° C. to 1100° C. The zirconium-based mixed oxides are also characterized by a surface area that exceeds 25 $m^2$/g, a pore volume that exceeds 0.20 $cm^3$/g, and an average pore size that is at least 30 nm after calcination at 1100° C. for 10 hours in air. Another feature of the zirconium-based mixed oxides is improved $CeO_2$ reducibility in the presence of rhodium (Rh) which manifests itself by a shift of $T_{max}$ in the temperature programmed reduction (TPR-$H_2$) to a lower temperature that is in the range from about 100° C. to about 200° C.

The following specific examples are given to illustrate the process for forming zirconium-based mixed oxides, as well as the zirconium-based mixed oxide compositions formed therefrom, and should not be construed to limit the scope of the disclosure. Those skilled-in-the-art, in light of the present disclosure, will appreciate that many changes can be made in the specific embodiments which are disclosed herein and still obtain alike or similar result without departing from or exceeding the spirit or scope of the disclosure. One skilled in the art will further understand that any properties reported herein represent properties that are routinely measured and can be obtained by multiple different methods. The methods described herein represent one such method and other methods may be utilized without exceeding the scope of the present disclosure.

In the following examples, pH of solutions and mixed oxide slurries are measured with a Cole-Parmer P100 pH-meter. A HORIBA LA-920 laser particle analyzer is used for the determination of particle size distribution. A Spectro Analytical Instruments inductively coupled plasma (ICP) spectrometer (Model FCPSA83D ICP) is used for analysis of materials chemical composition. Brunauer, Emmett, and Teller (BET) surface area, total porosity, and pore size distribution of fresh and aged samples is measured with the use of a Micromeritics TriStar II 3020 analyzer. A Micromeritics Autochem 2920 II instrument is used to test temperature programmed reduction (TPR) in the temperature range from 25° C. to 900° C. with a temperature ramp 10° C./min and a constant 90% Ar/10% $H_2$ gas flow rate of 5 $cm^3$/min. Aged mixed oxide phase purity and their crystallite size are determined with the use of a Rigaku MiniFlex II DESKTOP X-Ray diffractometer.

Example 1—Zirconium-Based Mixed Oxide of Composition 69.5% $ZrO_2$-22.5% $CeO_2$-5.0% $Y_2O_3$-3.0% $La_2O_3$ Preparation of polyvalent metal containing solution comprises mixing 255.4 g of a 27.2 wt. % zirconium nitrate solution, 79.3 g of a 28.3 wt. % cerium nitrate solution, 11.2 g of a 26.7. wt % lanthanum nitrate solution, and 25.9 g of a 19.7 wt. % yttrium nitrate solution. Electrolyte solution was prepared by dissolving 50 g of sodium nitrate in a 2 L beaker filled with 1600 mL of deionized water. The solution was agitated using a mechanical agitator set-up for 150 RPM. The pH of the electrolyte solution was adjusted to 10.5 with a 10% NaOH solution. Precipitation of zirconium-based mixed oxides was achieved by injection of a polyvalent metal-containing solution through a needle placed under the surface of the electrolyte solution. Simultaneously, a 25% NaOH solution was added to the beaker with a flow rate that maintains the pH of the reaction mixture in the range from 10.5 to 12.5 throughout the entire precipitation process.

After the addition of all polyvalent metal containing solution was completed, the reaction mixture was kept stirring for an additional 3 hours at ambient temperature. The aged precipitate was separated from the reaction mixture or mother liquor by filtration and washed with an excess of deionized water to remove sodium ions to a level that was less than 200 ppm. Then, the wet cake was calcined at 800° C. (ramp 10°/min) for 2 hours. A fresh sample of the wet cake was additionally aged at 1100° C. for 10 hours in air. A portion of the fresh sample was doped with 0.2 wt. % Rh by wet milling technique.

The surface area of the zirconium-based mixed oxides that were calcined at 800° C. is 54.5 $m^2$/g. The surface area of the mixed oxides that were aged at 1100° C. for 10 hours in air is 28.5 $m^2$/g. Zirconium-based mixed oxides have a high resistance to thermal sintering and retain about 52% of its surface area after aging at 1100° C. The average pore size after aging at 1100° C. is 33 nanometers (nm), and aged pore volume is 0.235 $cm^3$/g. The fresh sample that was impregnated with 0.2 wt. % Rh and aged at 1100° C. for 10 hours exhibited a TPR-$H_2$ $T_{max}$ of oxide of 245° C., which is 125° C. lower than that of the corresponding reference material (see Comparative Example 4).

Example 2—Zirconium-Based Mixed Oxide of Composition 57.5% $ZrO_2$-35.0% $CeO_2$-7.0% $Y_2O_3$-3.0% $La_2O_3$ The preparation of a polyvalent metal-containing solution comprises mixing 220.0 g of a 20.0 wt. % zirconium oxychloride solution, 99.2 g of a 28.2 wt. % cerium nitrate solution, 10.3 g of a 23.3 wt. % lanthanum nitrate solution, and 24.4 g of a 23.0 wt. % yttrium nitrate solution. An electrolyte solution was prepared by dissolving 50 g of sodium nitrate in a 2 L beaker filled with 1600 mL of deionized water. The solution was agitated using a mechanical agitator set-up for 150 RPM. The pH of the electrolyte solution was adjusted to 10.0 with a 10% NaOH solution. Precipitation of zirconium-based mixed oxides was achieved by injection of the polyvalent metal-containing solution through a needle placed under the surface of the electrolyte solution. Simultaneously, a 25% NaOH solution was added to the beaker at a flow rate that allows the pH of the reaction mixture to be maintained in the range of 10.0 to 12.0 throughout the entire precipitation process. After the addition of all of the polyvalent metal-containing solution, the reaction mixture was kept stirring for an additional 1 hour at 50° C. The aged precipitate was separated from the mother liquor by filtration and washed with an excess of deionized water to remove sodium ions to level that was less than 200 ppm. Then the wet cake was calcined at 800° C. (ramp 10°/min) for 2 hours. A fresh sample was additionally aged at 1100° C. for 10 hours in air. A portion of the fresh sample was doped with 0.2% Rh using a wet milling technique.

The surface area of zirconium-based mixed oxides after calcination at 800° C. is 56.2 $m^2$/g and the surface area of the zirconium-based mixed oxides that were aged at 1100° C. for 10 hours in air is 32.4 $m^2$/g. The zirconium-based mixed oxides have a high resistance to thermal sintering and retain about 58% of its surface area after aging at 1100° C. The average pore size after aging at 1100° C. is 35 nm, and aged pore volume is 0.221 $cm^3$/g. The fresh sample after being impregnated with 0.2% Rh and aged at 1100° C. for 10 hours exhibited a TPR-$H_2$ $T_{max}$ of oxide at 110° C., which is 115° C. lower than that of corresponding reference material (see comparative Example 5).

Example 3—Zirconium-based Mixed Oxide of Composition 47.5% $ZrO_2$-42.5% $CeO_2$-6.0% $Pr_6O_{11}$-4.0% $La_2O_3$ The preparation of a polyvalent metal-containing solution comprises mixing 202.0 g of a 23.5 wt. % zirconium nitrate solution, 149.8 g of a 28.4 wt. % cerium nitrate solution, 15.0 g of a 26.7 wt. % lanthanum nitrate solution, and 23.5 g of a 25.6 wt. % praseodymium nitrate solution. The electrolyte solution was prepared by dissolving 50 g of sodium nitrate in a 2 L beaker filled with 1600 mL of deionized water. The reaction mixture was agitated using a mechanical agitator set-up for 150 RPM. The pH of the electrolyte solution was adjusted to 10.0 with a 10% NaOH solution. Precipitation of zirconium-based mixed oxide was achieved by injection of the polyvalent metal containing solution through a needle placed under the surface of the electrolyte solution. Simultaneously, a 25% NaOH solution was added to the beaker with a flow rate that maintains the pH of the reaction mixture in the range of 10.0 to 12.0 throughout the entire precipitation process. After the addition of all of the polyvalent metal-containing solution, the reaction mixture was kept stirring for an additional 1 hour at ambient temperature. The aged precipitate was separated from reaction mixture or mother liquor by filtration and washed with an excess of deionized water to remove sodium ions to level that was less than 200 ppm. Then, the wet cake was calcined at 800° C. (ramp 10°/min) for 2 hours. A fresh sample was additionally aged at 1100° C. for 10 hours in air. A portion of the fresh sample was doped with 0.2% Rh using a wet milling technique.

The surface area of the zirconium-based mixed oxides calcined at 800° C. is 58.4 m$^2$/g and of the zirconium-based mixed oxides aged at 1100° C. for 10 hours in air is 26.3 m$^2$/g. The zirconium-based mixed oxides have a high resistance to thermal sintering and retain about 45% of its surface area after aging at 1100° C. The average pore size after aging at 1100° C. is 33 nm, and the aged pore volume is 0.217 cm$^3$/g. The fresh sample was impregnated with 0.2% Rh and aged at 1100° C. for 10 hours to provide a zirconium-based mixed oxide exhibiting a TPR-H$_2$ T$_{max}$ of oxide is 105° C., which is 175° C. lower than that of reference material (see comparative Example 6).

Comparative Example 4—Compare to Example 1

The preparation of a polyvalent metal-containing solution comprises mixing 198.5 g of a 27.2 wt. % zirconium nitrate solution, 70.5 g of a 28.3 wt. % cerium nitrate solution, 10.5 g of a 26.7 wt. % lanthanum nitrate solution, and 19.6 g of a 19.7 wt. % yttrium nitrate solution. The electrolyte solution was prepared by dissolving 250 g of sodium hydroxide in a 2 L beaker filled with 1600 mL of deionized water (pH >13.0). The solution was agitated using a mechanical agitator set-up for 150 RPM. Precipitation of zirconium-based mixed oxides was achieved by injection of the polyvalent metal containing solution through a needle placed under the surface of the electrolyte solution. After the addition of all of the polyvalent metal-containing solution, the reaction mixture was kept stirring for an additional 1 hour at ambient temperature. The aged precipitate was separated from the mother liquor by filtration and washed with an excess of deionized water to remove sodium ions to level that was less than 200 ppm. Then, the wet cake was calcined 800° C. (ramp 10°/min) for 2 hours. A fresh sample was additionally aged at 1100° C. for 10 hours in air. A portion of the fresh sample was doped with 0.2% Rh using a wet milling technique.

The surface area of the zirconium-based metal oxides calcined at 800° C. is 72.5 m$^2$/g and the surface area of the zirconium-based metal oxides aged at 1100° C. for 10 hours in air is 8.5 m$^2$/g. The comparable zirconium-based mixed oxide has a low resistance to thermal sintering and retains only 12% of its surface area after ageing at 1100° C. The aged pore volume of the zirconium-based mixed oxide is 0.025 cm$^3$/g. The fresh sample was impregnated with 0.2% Rh and aged at 1100° C. for 10 hours. The impregnated sample after aging exhibited a TPR-H$_2$ T$_{max}$ of oxide of 370° C., which is 125° C. higher than that of the zirconium-based mixed oxides of Example 1.

Comparative Example 5—Compare to Example 2

Preparation of the polyvalent metal-containing solution comprises mixing 220.0 g of a 20.0 wt. % zirconium oxychloride solution, 99.2 g of a 28.2 wt. % cerium nitrate solution, 10.3 g of a 23.3 wt. % lanthanum nitrate solution, and 24.4 g of a 23.0 wt. % yttrium nitrate solution. The electrolyte solution was prepared by dissolving 300 g of sodium hydroxide in a 2 L beaker filled with 1600 mL of deionized water (pH>13.0). The solution was agitated using a mechanical agitator set-up for 150 RPM. Precipitation of zirconium-based mixed oxide was achieved by injection of polyvalent metal containing solution through needle placed under the surface of the electrolyte solution. After the addition of the entire polyvalent metal containing solution, the reaction mixture or mother liquor was kept stirring for an additional 3 hours at ambient temperature. The aged precipitate was separated from mother liquor by filtration and washed with excess of deionized water to remove sodium ions to a level that was less than 200 ppm. Then, the wet cake was calcined 800° C. (ramp 10 o/min) for 2 hours. A fresh sample was additionally aged at 1100° C. for 10 hours in air. A portion of the fresh sample was doped with 0.2% Rh by wet milling technique.

The surface area of the zirconium-based metal oxides calcined at 800° C. is 81.1 m$^2$/g and the surface area of the zirconium-based metal oxides aged at 1100° C. for 10 hours in air is 6.2 m$^2$/g. The comparable zirconium-based mixed oxide has low resistance to thermal sintering and retains only 8% of surface area after aging at 1100° C. The aged pore volume of the zirconium-based metal oxides is 0.015 cm3/g. The fresh sample was impregnated with 0.2% Rh and was aged at 1100° C. for 10 hours. The impregnated sample after aging exhibited a TPR-H$_2$ T$_{max}$ of oxide of 225° C., which is 115° C. higher than that of zirconium-based metal oxides in Example 2.

Comparative Example 6—Compare to Example 3

The preparation of a polyvalent metal-containing solution comprises mixing 202.0 g of a 23.5 wt. % zirconium nitrate solution, 149.8 g of a 28.4 wt. % cerium nitrate solution, 15.0 g of a 26.7 wt. % lanthanum nitrate solution, and 23.5 g of a 25.6 wt. % praseodymium nitrate solution. Electrolyte solution was prepared by dissolving 50 g of sodium nitrate in a 2 L beaker filled with 1600 mL of deionized water. The solution was agitated using a mechanical agitator set-up for 150 RPM. The pH of the electrolyte solution was adjusted to 10.0 with a 10% NaOH solution. Precipitation of zirconium-based mixed oxides was achieved by injection of polyvalent metal containing solution through needle placed under the surface of the electrolyte solution. After the addition of the entire polyvalent metal-containing solution, the reaction mixture was kept stirring for an additional 3 hours at ambient temperature. The aged precipitate was separated from the mother liquor by filtration and washed with an excess of deionized water to remove sodium ions to level that was less than 200 ppm. Then, the wet cake was calcined 800° C. (ramp 10o/min) for 2 hours. A fresh sample was additionally aged at 1100° C. for 10 hours in air. A portion of the fresh sample was doped with 0.2% Rh using a wet milling technique.

The surface area of the zirconium-based metal oxides calcined at 800° C. is 66.8 m$^2$/g and the surface area of the zirconium-based metal oxides aged at 1100° C. for 10 hours in air is 5.7 m$^2$/g. The comparable zirconium-based mixed oxides have a low resistance to thermal sintering and retain only 9% of surface area after aging at 1100° C. The aged pore volume is 0.013 cm$^3$/g. A fresh sample was impregnated with 0.2% Rh and was aged at 1100° C. for 10 hours. The impregnated sample after aging exhibited a TPR-H$_2$ T$_{max}$ of oxide of 280° C., which is 175° C. higher than that of the zirconium-based mixed oxides in Example 3.

Within this specification, the embodiments have been described in a way which enables a clear and concise specification to be written, but it in intended and will be appreciated that the embodiments may be variously combined or separated without parting from the invention. For example, it will be appreciated that all preferred features described herein are applicable to all aspects of the invention described herein.

The foregoing description of various forms of the invention has been presented for purposes of illustration and description. It is not intended to be exhaustive or to limit the invention to the precise forms disclosed. Numerous modifications or variations are possible in light of the above teachings. The forms discussed were chosen and described to provide the best illustration of the principles of the invention and its practical application to thereby enable one of ordinary skill in the art to utilize the invention in various forms and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method for making mesoporous, zirconium-based mixed oxides, the method comprising:
   preparing a polyvalent metal-containing solution by dissolving in an aqueous medium a combination of water soluble compounds that have zirconium as a metal element and water soluble compounds that have one or more metal elements chosen from the group consisting of cerium, praseodymium, lanthanum, yttrium, neodymium, nickel, copper, cobalt, manganese, niobium, and combinations thereof;
   injecting the polyvalent metal-containing solution into an electrolyte solution to form a mother liquor; the electrolyte solution having a pH that exceeds the isoelectric point pH(I) for zirconium-based mixed oxides; the injection occurring at pH from pH(I)+2 up to pH(I)+4, wherein the pH(I) is in the range from 7.5 to 8.8;
   forming a precipitate in the mother liquor;
   allowing the precipitate to age in the mother liquor and form the mesoporous, zirconium-based mixed oxides;
   wherein a basic solution is added at a flow rate that allows the pH of the mother liquor to be maintained in the range of 10.0 to 12.0 throughout the entire precipitation process;
   washing the mesoporous, zirconium-based mixed oxides with an aqueous medium;
   drying the mesoporous, zirconium-based mixed oxides; and
   collecting the mesoporous, zirconium-based mixed oxides.

2. The method of claim 1, wherein the water soluble compounds are chosen from the group of water soluble metal-containing nitrate salts, chloride salts, acetate salts, sulfate salts, and combinations thereof.

3. The method of claim 1, wherein the water soluble compounds in the polyvalent metal-containing solution are present in an amount ranging from greater than 0 wt. % up to about 50 wt. %.

4. The method of claim 1, wherein the electrolyte solution comprises water soluble salts containing cations chosen from the group $Li^+$, $Na^+$, $K^+$, $NH_4^+$, and combinations thereof, and anions chosen from the group $Cl^-$, $NO_3^-$, $CH_3COO^-$, $CO_3^{-2}$, $SO_4^{-2}$, and combinations thereof dissolved in an aqueous medium.

5. The method of claim 1, wherein injection of the polyvalent metal-containing solution into the electrolyte solution occurs at an ambient or elevated temperature.

6. The method of claim 1, wherein the precipitate comprises a plurality of absorption sites, such that the cations and anions of the electrolyte solution that are adsorbed by the precipitate occupy from about 10% up to about 30% of the plurality of adsorption sites available under the precipitation conditions.

7. The method of claim 1, wherein the mother liquor in which the precipitate is formed comprises from about 3 mmol $OH^-$ up to about 30 mmol $OH^-$ per mole of the mesoporous zirconium-based mixed oxides.

8. The method of claim 1, wherein the precipitate is aged in the mother liquor at an ambient or elevated temperature for a period of time that ranges between about 1 hour and about 6 hours.

9. The method of claim 1, wherein the collected mesoporous, zirconium-based mixed oxides exhibit a specific morphology of freshly made primary particle agglomerates that have single modal particle size distribution with maximum peaks occurring between about 10 μm and about 15 μm.

10. The method of claim 1, wherein the method further comprises exposing the mesoporous, zirconium-based mixed oxides to progressive calcination or thermal aging at a temperature that is in the range of about 800° C. to about 1100° C.; such that the specific resistance of surface area for the mesoporous, zirconium-based mixed oxides decreases by not more than 55% upon the calcination or thermal aging.

11. The method of claim 1, wherein the method further comprises impregnating the collected mesoporous, zirconium-based mixed oxides with rhodium (Rh) in order to exhibit a $CeO_2$ reducibility manifested by a $T_{max}$ in a TPR-$H_2$ at a temperature that is in the range of about 100° C. to about 200° C.

12. The method of claim 10, wherein the method further comprises subjecting the mesoporous, zirconium-based mixed oxides to calcination at 1100° C. for 10 hours in air, such that the mesoporous, zirconium-based mixed oxides exhibit: (i) a surface area that exceeds 25 $m^2/g$; (ii) a pore volume that exceeds 0.20 $cm^3/g$; (ii) an average pore size that is at least 30 nanometers (nm); and (iv) an average crystallite size that is in the range from about 8 nm to about 15 nm.

13. The method of claim 10, wherein the collected mesoporous, zirconium-based mixed oxides after calcination or thermal aging exhibit a tetragonal/cubic crystalline structure.

* * * * *